United States Patent [19]

Bourg et al.

[11] 4,088,470
[45] May 9, 1978

[54] PROCESS OF HEAT SAGGING GLASS ARTICLES

[75] Inventors: André Bourg, Lewarde; Jean P. M. Hazart, Douai; Jacques Y. Jouret, Aniche, all of France

[73] Assignee: Corning Glass Works, Corning, N.Y.

[21] Appl. No.: 773,958

[22] Filed: Mar. 3, 1977

[30] Foreign Application Priority Data

Mar. 18, 1976 France .............................. 76 07905

[51] Int. Cl.² .............................................. C03B 23/02
[52] U.S. Cl. ........................................ 65/105; 65/107; 65/DIG. 2
[58] Field of Search ................... 65/105, 107, DIG. 2

[56] References Cited

U.S. PATENT DOCUMENTS

| 643,223 | 2/1900 | Dhe et al. | 65/107 |
| 1,048,227 | 12/1912 | Straubel | 65/107 |
| 2,261,023 | 10/1941 | Galey | 65/107 |
| 4,017,293 | 4/1977 | Illig | 65/107 |

FOREIGN PATENT DOCUMENTS

267,845  1/1968  U.S.S.R. ............................. 65/107

Primary Examiner—Arthur D. Kellogg
Attorney, Agent, or Firm—Burton R. Turner; Clarence R. Patty, Jr.

[57] ABSTRACT

A preformed sheet of glass is formed by sagging such a sheet with a plurality of linked indentations comprising multiple curved interdependent impressions from which a plurality of sagged pieces are cut to produce lenses in final form.

4 Claims, 8 Drawing Figures

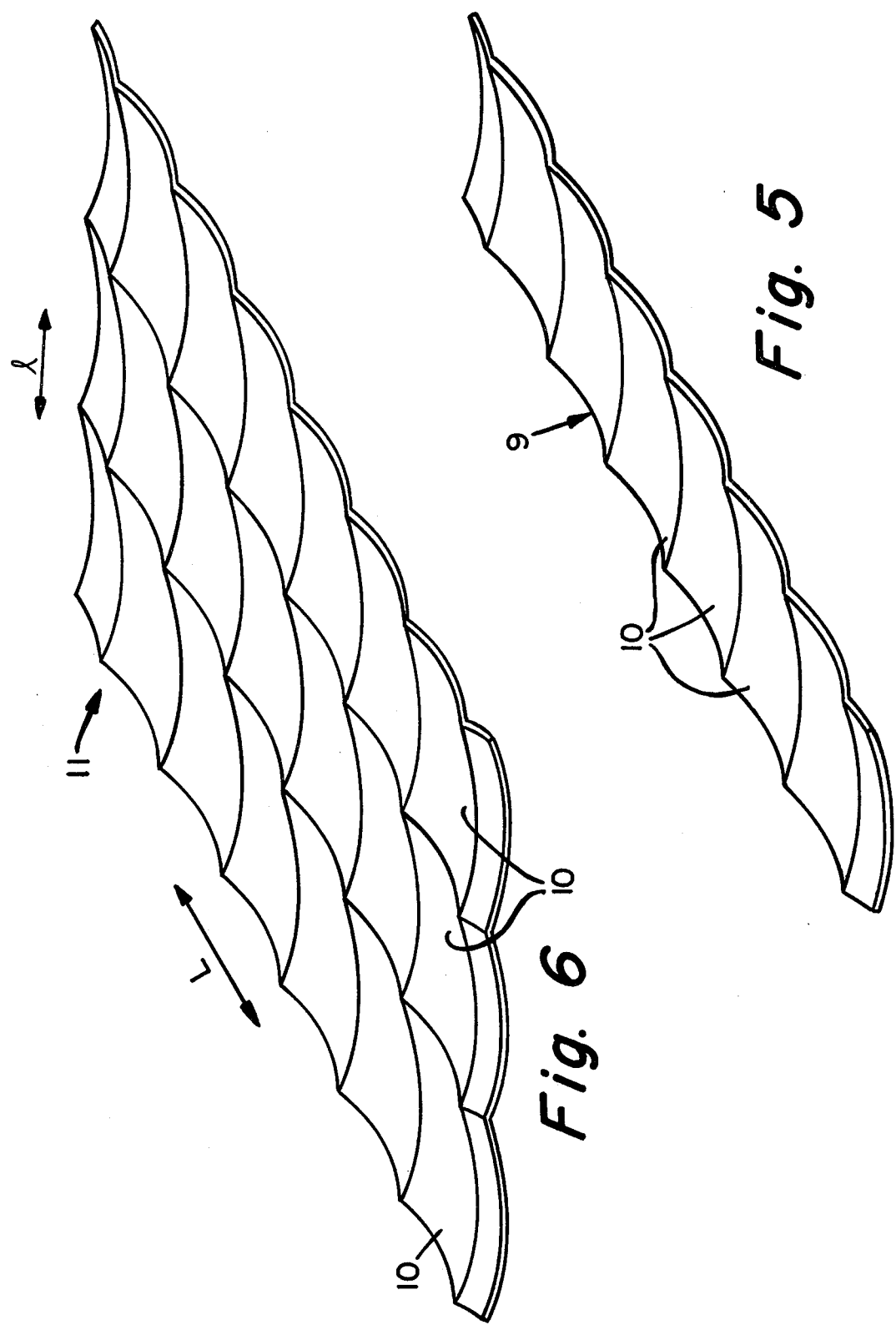

PROCESS OF HEAT SAGGING GLASS ARTICLES

BACKGROUND OF THE INVENTION

The present invention relates to the manufacture of curved glass articles, and more particularly to the manufacture of lenses for sunglasses by sag-forming the same from a sheet of flat glass.

In current operation, individual pieces of glass, usually cut from a flat sheet, are sagged from their original form by placing them upon a curved mold so as to be supported on their periphery, and then subjecting them to a temperature cycle which softens the glass for sagging, and then the glass is annealed. At the time the glass is softened, it may be sagged by natural gravity flow, or by additional pressing, with or without contact with the curved sidewall of the mold. It is advisable to shorten the softening cycle when there is contact with the sidewall, so as to preserve the original surface quality of the glass. In general, should the glass, while at high temperatures, contact another surface, it is usually necessary to polish the glass to restore its optical qualities, especially with glasses for use in the spectacle-making industry.

The normal process of manufacturing lenses for sunglasses includes the sagging of a plurality of individual round, square and other forms of "coquilles" from flat glass. The lenses are then cut out from the sagged round or square coquilles and may undergo diverse finishing operations. The coquilles are considered to be semifinished products which should possess certain properties of the final product, notably the properties of transmission, color and optical quality, where optical quality includes glass quality as well as physically measured optical parameters.

The essential properties of the lenses or of the sagged blank, are its radius of curvature, thickness and index of refraction. Using an approximation from thick lens formulae shows that the transmitted power of a sagged lens (concentric radii of curvature) is given by $$P \approx \frac{-d(n-1)}{\eta R^2}$$

where P is the optical power, d the lens thickness, $\eta$ the refractive index, and $R^2 \approx R_1 R_2$, the radii of curvature. That is, the optical quality of a coquille is very sensitive to its curvature; and accordingly it is the aim of all sagging processes to obtain a regular curvature for a single lens which is consistent from one to another.

The power P of a curved surface is expressed in diopters by the following relation:

$$P = \frac{\eta \text{glass} - \eta \text{air}}{\text{radius of curvature (in meters)}}$$

$\eta$ being the refractive index of the light. Thus both transmitted power and surface power are sensitive to the radius of curvature. The regularity of the curvature depends upon the sagging quality. In the manufacture of lenses for safety spectacles, the sagging is effected without the central part of the lens coming into contact with the mold. The best known sagging is obtained by maintaining the periphery of the glass piece to be sagged in a fixed position, such as by clamping; whereas a lesser but nevertheless acceptable quality may be obtained by simply placing the periphery of the piece in contact with the mold.

In both of these known methods, the periphery of the blanks presents a different curvature to that of the center of the sagged piece, and also a surface state which is incompatible with good optical quality. Accordingly, it is necessary to cut the required lens contour from a central portion of the sagged piece in order to avoid the nonuniformly sagged peripheral portion. Thus, in the known processes, the obtainment of a good lens necessitates two cutting operations: firstly, the cutting out of an overdimensioned disc in flat glass for the sagging operation, and then the cutting out of the final form from the center of the sagged piece.

A further known method of forming said pieces is to initially cut out the defined size and shape from flat glass. However the sagging is then more delicate, as it is difficult to assure limited contact between the mold and the sagged form. The regularity of curvature is therefore, as a general rule, less good than that which would be obtained with the above-described process using two cutting operations.

Accordingly, the present invention permits the obtainment of a good regularity to curvature while avoiding a double cutting operation, and further reduces glass losses.

SUMMARY OF THE INVENTION

In its simplest form, the present invention is directed to the manufacture of lenses for spectacles such as sunglasses, by sagging a strip or sheet of flat glass into a preformed product having a plurality of adjacent or connected curved impressions or concave recesses, and cutting out final sagged lens pieces from such curved impressions with currently available cutting apparatus.

The preformed product may be in the form of a strip of multi-indented glass comprising a single line of curved impressions, situated one behind the other, or as a variant, the multi-indented sheet of glass can comprise several rows of curved impressions which may be aligned both in the sense of the length and width of the sheet, although a quincunx arrangement may be employed as desired.

The present invention not only relates to the use of such a preformed product for manufacturing lenses, but also to the process of forming the preformed product itself, through the multiple-indenting of a sheet of flat glass. The process involves the utilization of an alveolated mold for forming a multi-indented single plate having a plurality of protuberances or raised portions intermediate such multi-indentations. The sheet of flat glass rests upon the summits of such protuberances during the period in which such glass is positioned within a furnace and subjected to softening temperatures. The multiple zones of contact between the glass sheet and the alveolated mold may be linear (for example, circles or other closed figures bounding the upper periphery of each impression), but preferably are pointed (for example, four support points at the summits of a square abounding each such impression).

In either case, whether the sheet of glass is supported at the raised peripheral portions of each impression by means of a line or points, the fact that the glass is so supported at the time that it is subjected to softening temperatures, permits a natural flow of the glass during softening to obtain a quasi-spherical form, that is to say, a uniform curvature about the sagged article.

The process of the present invention has the advantages of the relatively high utilization of material (in relation to the surface of all of the sagged pieces with the surface of the original glass sheet), the simplicity of the overall sagging operation, and the uniformity of the pieces obtained. Moreover, for an equal number of pieces, the preformed product that constitutes the sheet of multi-indented glass notably facilitates the handling, packaging and stacking of the ware when compared with the individual detached coquilles of the current process.

The use of the present invention is not dependent upon the glass composition and, in fact, very satisfactory results have been obtained with glasses of various compositions, including tinted soda-lime-silica glasses and photochromic glasses. In fact, the present invention overcomes problems previously encountered in developing the photochromic properties of such glasses, since undesirable deformation tended to occur during the required thermal cycling. That is, with the present invention it is now possible to develop the desired photochromic properties in the sheet at the same time that the sheet is sagged into a preform having a plurality of recesses with a predetermined curvature for forming optical lenses.

An object of the present invention has been to provide a preformed product from which a plurality of sagged pieces in final form may be cut out in a single cutting operation, wherein the preformed product represents a sheet of glass with multiple linked indentations comprising a number of curved interdependent impressions corresponding respectively to the aforesaid sagged pieces to be cut out.

BRIEF DESCRIPTION OF THE DRAWINGS

FIG. 4 is a somewhat schematic perspective view of a further embodiment of the invention.

FIG. 5 is a perspective view of a molded preformed product formed with the alveolated mold of FIG. 4.

FIG. 6 is a perspective view of a further preformed product.

BRIEF DESCRIPTION OF THE PREFERRED EMBODIMENTS

Figure 1:
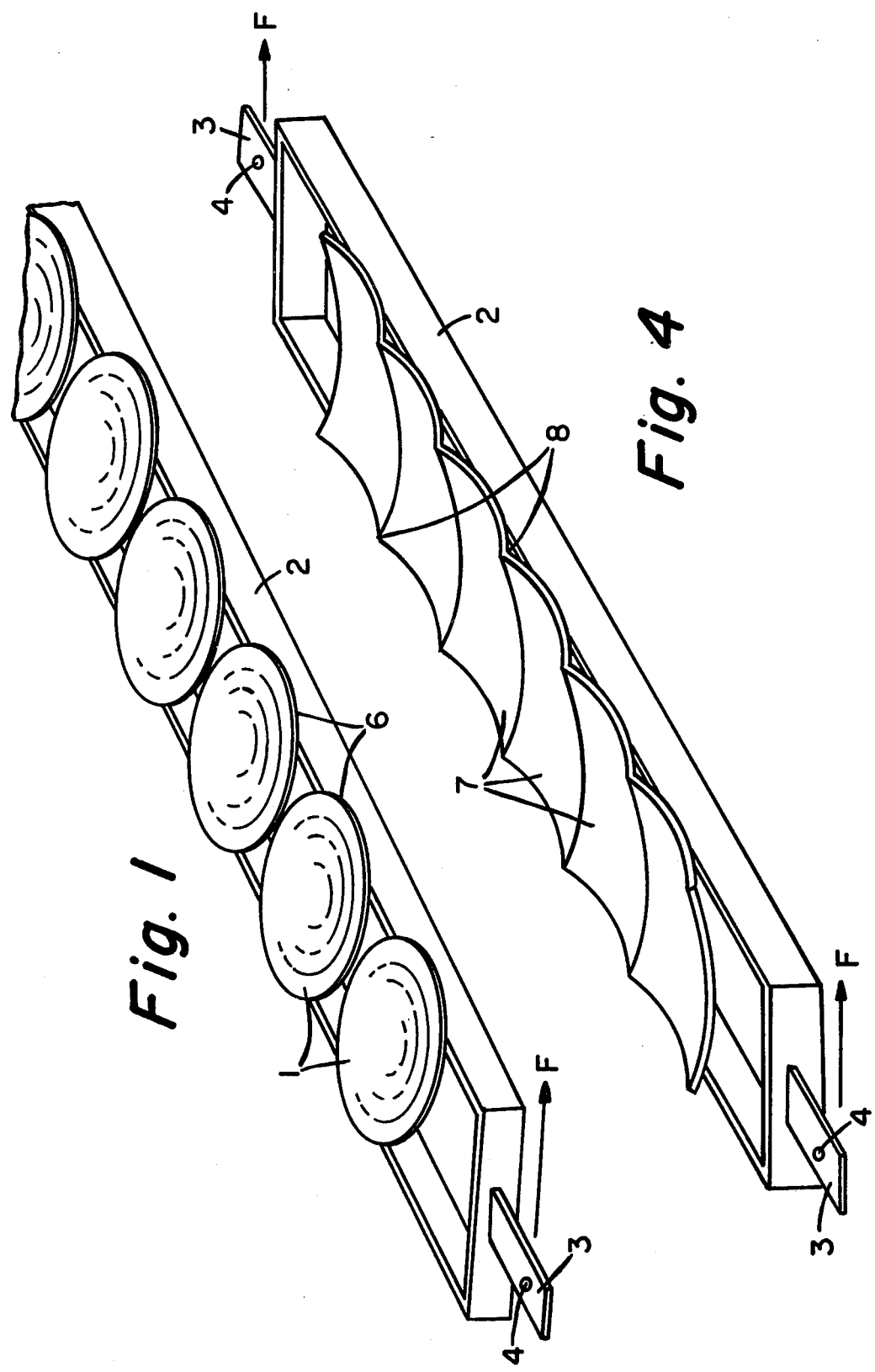
FIG. 1 is a somewhat schematic perspective view of one embodiment of an alveolated mold conforming to the present invention.
Figure 3:
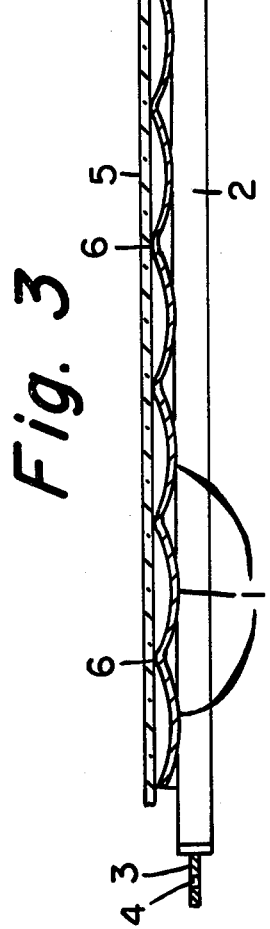
FIG. 3 is an elevational view in section such as taken along line 3—3 of FIG. 2 but showing the alveolated mold of FIG. 1.

Referring now to FIG. 1, an alveolated mold is shown comprising a plurality of juxtapositioned pressed and polished cupels 1 of suitable mold material such as steel, in the general form of spherical recesses or calottes with the concavity being upwardly oriented toward the top or raised peripheral edge 6 thereof. The individual cupels 1 of the mold are supported by a rectangular frame 2, furnished with handling lugs 3 at each end thereof having a perforated opening 4 for attaching the mold set to a conveyor for movement therealong in the direction of the arrow F. The overall size may be approximately 800 mm × 75 mm. As shown in FIG. 3, a sheet of glass 5 in the form of a flat rectangular strip, which may be about 700 × 70 mm, is placed upon the mold and is linearly supported thereon by the upper circular edges or raised portions 6 around the upper periphery of each of the cupels 1.

The mold assembly with the glass positioned thereon is then subjected to a thermal process of sagging, such that the glass sheet flows or bends by gravity into the hollows of the cupels 1, which function as so many calorific radiators. The supporting upper peripheral edges 6 of the cupels 1 permit the glass sheet to sag uniformly in semispherical shape within the concavity of the cupels without contacting the surface thereof. Upon completion of the sagging cycle, the sheet is cooled, annealed and a preformed strip of glass is obtained having a series of curved impressions formed therein, from which afocal lenses may be cut as previously described.

Figure 2:
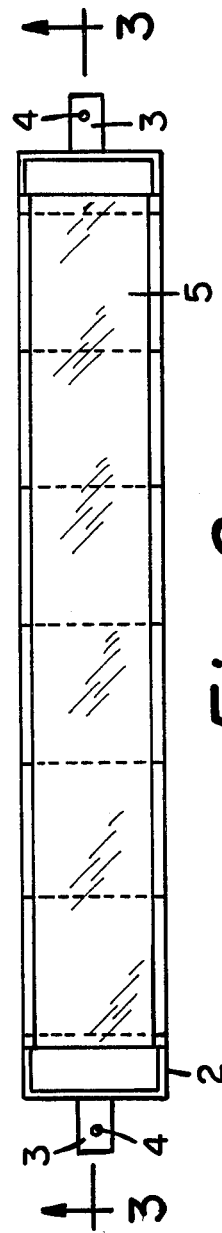
FIG. 2 is a somewhat schematic top plan view showing a sheet of flat glass placed upon an alveolated mold such as shown in FIG. 4.

Referring now to FIG. 4, an alveolated mold is shown wherein the alveoli of the mold are squares or rectangles 7 of a general concave configuration having curvilinear upper edges and skewed surfaces. The concave squares or rectangular alveoli 7 terminate at their upper ends in raised support portions such as points or summits 8 for supporting a sheet of glass in the form of a flat rectangular strip positioned thereon. The mold assembly of FIG. 4, includes the square or rectangular alveoli 7, and support frame 2 having tabs 3 with openings 4. When the mold assembly of FIG. 4 is provided with a strip of glass 5 as shown in FIG. 2, and subjected to a sagging cycle, the molded product obtained from such a sheet of glass is shown at 9 in FIG. 5, and comprises a line of juxtapositioned curved impressions 10.

If one were to use a mold with several rows of alveoli and a wide sheet of flat glass to cover such mold, one would obtain a product as shown at 11 in FIG. 6, having several rows of curved impressions 10 aligned in both the sense of length L and width 1. Here again, the raised summits or support points 8 at the periphery of the concave recesses, intermediate the alveoli of the mold assembly, permit the glass sheet to sag during its thermal cycle with a uniform, substantially spherical curvature within the concavity of the alveoli without contacting the surface thereof, so that finished lenses may be cut from the interconnected curved impressions of the preformed articles 9 or 11 as shown in FIGS. 5 and 6 respectively.

Figure 7:
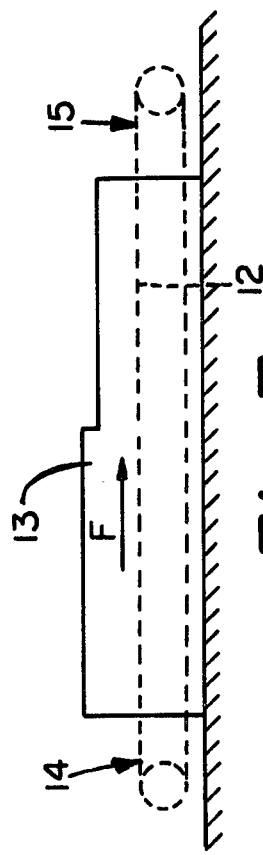
FIG. 7 is a schematic view of the lateral elevation of an installation for use with the present invention.
Figure 8:
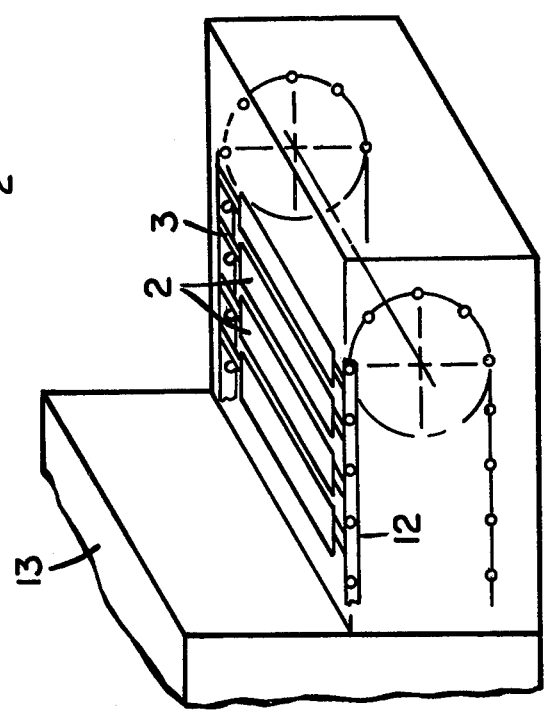
FIG. 8 is a fragmental perspective view on a larger scale of a part of the installation shown in FIG. 7.

Referring now to FIGS. 7 and 8, apparatus is shown for mounting the carrier frame 2 for the molds on an endless conveyor 12 associated with a tunnel furnace 13. The molds are loaded onto an upper driven side 14 of the conveyor 12, before entering into the furnace 13, wherein they are subjected to a predetermined thermal sagging process, and the molds and carriers with the sagged preform are unloaded from the conveyor 12 at the exit end 15 of furnace 13, upon exiting from the aforesaid furnace.

The following examples are given, by means of illustration, to show the possibilities offered by the present invention and to bring out its advantages of obtaining products with a regular uniform curvature without diminishing the useful surface of the glass utilized.

EXAMPLE 1

A sheet of grey photochromic glass 760 × 75 × 2 mm was sagged on an alveolated mold, such as that shown in FIG. 1, having 10 round impressions of 74 mm diameter, with the following results:

Curvature at the center: 4.5 ± 0.25 diopters

Curvature at the edge: (at approximately 15 mm) 4.75 ± 0.5 diopters maximum dimension of the lens: 72 mm.

The glass was raised to about 655° C. in about 5 minutes, cooled to about 595° C. in about 6 minutes and then uniformly cooled to room temperature.

EXAMPLE 2

A sheet of brown photochromic glass 700 × 76 × 1.5 mm was sagged on an alveolated mold such as shown in FIG. 4 having ten rectangular impressions 67 × 76 mm with the following results:

Curvature at the center: 4.5 ± 0.25 diopters

Curvature at the edge: 4.75 ± 0.50 diopters maximum dimensions of the lens: maxi axis 70 mm; minor axis 60 mm.

The glass was heated to about 680° C. in 3 minutes, cooled to about 610° C. in about four minutes and cooled to room temperature.

EXAMPLE 3

A sheet of grey soda-lime glass 700 × 76 × 1.75 mm was sagged on a mold analogous to the preceding with 10 rectangular impressions 67 × 70 mm. The results are the following:

Curvature at the center: 5 ± 0.25 diopters

Curvature at the edge: 5.25 ± 0.5 diopters maximum dimensions of the lens: major axis 70 mm; minor axis 60 mm.

Conventional sagging cycles for soda-lime glass were used in this operation, since only sagging was required, and no photochromic properties needed to be developed.

EXAMPLE 4

A sheet of white soda-lime glass 760 × 250 × 3 mm was sagged, again using conventional cycles, on a mold with 30 round impressions, 74 mm diameter, arranged in three rows:

Curvature at the center: 3.5 ± 0.5 diopters

Curvature at the edge: 3.75 ± 0.5 diopters maximum dimension of the lens: 72 mm.

In the sagging of photochromic sheet glass, of a composition such as disclosed in U.S. Pat. No. 3,208,860, and the simultaneous development of the photochromic properties thereof, temperatures of between about 660° and 680° C. for about 2 to 4 minutes will produce curvatures of between 4 and 6 diopters in 1.5 mm sheet with transmission down to about 20%.

As noted above, the described advantages obtained with the present invention do not in any way diminish the optical qualities of the lenses obtained. These optical qualities (such as are defined by international standards), are expressed in terms of visibility distortion, prism effects and regular astigmatism. For a given quality and thickness of glass, there is no discernible difference between the optical quality of the lenses cut from individual coquilles by the known technique, and those cut from the preformed sheets with multiple impressions of the present invention.

Although we have disclosed the now preferred embodiments of our invention, it will be apparent to those skilled in the art that various changes and modifications may be made thereto without departing from the spirit and scope thereof as defined in the appended claims.

We claim:

1. A process for forming lenses for spectacles comprising, providing an alveolated mold having a plurality of juxtapositioned upwardly open concave surface portions with the uppermost edges of the concave surfaces being continuous circular edges providing raised linear support portions between said concave surfaces, positioning a sheet of glass upon said alveolated mold and supporting such sheet by said raised linear support portions, subjecting said sheet of glass to a thermal sagging cycle, uniformly sagging such sheet downwardly within the concave portions of said alveolated mold to form said sheet into a plurality of substantially spherical shapes with uniformly curved indentations in an upper surface of said sheet, discontinuing the thermal sagging cycle prior to there being contact between the sheet and the concave surface portions, cooling the sagged sheet to form a glass preform with a plurality of interconnected curved indentations, and cutting finished lenses from the uniformly curved indentations formed in said preform.

2. A process for forming lenses as defined in claim 1 including the steps of positioning a sheet of photochromic glass upon said alveolated mold, and simultaneously developing the photochromic properties of said sheet while sagging such sheet downwardly within the concave portions of said alveolated mold.

3. A process for forming lenses for spectacles comprising, providing an alveolated mold having a plurality of juxtapositioned upwardly open concave surface portions with the uppermost edges of the concave surfaces rising into a plurality of support points intermediate said adjacent concave surfaces, positioning a sheet of glass upon said alveolated mold and supporting such sheet by said raised point support portions, subjecting said sheet of glass to a thermal sagging cycle, uniformly sagging such sheet downwardly within the concave portions of said alveolated mold to form said sheet into a plurality of substantially spherical shapes with uniformly curved indentations in an upper surface of said sheet, discontinuing the thermal sagging cycle prior to there being contact between the sheet and the concave surface portions, cooling the sagged sheet to form a glass preform with a plurality of interconnected curved indentations, and cutting finished lenses from the uniformly curved indentations formed in said preform.

4. A process for forming lenses as defined in claim 3 including the steps of positioning a sheet of photochromic glass upon said alveolated mold, and simultaneously developing the photochromic properties of said sheet while sagging such sheet downwardly within the concave portions of said alveolated mold.

* * * * *